US012573932B2

(12) United States Patent
Kim

(10) Patent No.: US 12,573,932 B2
(45) Date of Patent: Mar. 10, 2026

(54) LINEAR MOTOR AND LINEAR COMPRESSOR

(71) Applicant: LG ELECTRONICS INC., Seoul (KR)

(72) Inventor: Jaebeum Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1137 days.

(21) Appl. No.: 17/277,141

(22) PCT Filed: Sep. 17, 2019

(86) PCT No.: PCT/KR2019/011980
§ 371 (c)(1),
(2) Date: Jan. 10, 2022

(87) PCT Pub. No.: WO2020/060144
PCT Pub. Date: Mar. 26, 2020

(65) Prior Publication Data
US 2022/0140719 A1     May 5, 2022

(30) Foreign Application Priority Data

Sep. 17, 2018     (KR) ........................ 10-2018-0110818

(51) Int. Cl.
*H02K 41/03*          (2006.01)
*F04B 35/04*          (2006.01)
(Continued)

(52) U.S. Cl.
CPC ............. *H02K 41/03* (2013.01); *F04B 35/04* (2013.01); *F04B 39/0005* (2013.01); *F04B 39/12* (2013.01); *H02K 16/04* (2013.01)

(58) Field of Classification Search
CPC ........ H02K 35/02; H02K 41/00; H02K 41/02; H02K 7/1869; H02K 7/1876; F04B 35/04; F04B 35/045; F04B 39/0005; F04B 39/12
(Continued)

(56) References Cited

U.S. PATENT DOCUMENTS

2005/0112000 A1    5/2005   Jung
2007/0152517 A1    7/2007   Park et al.
(Continued)

FOREIGN PATENT DOCUMENTS

CN          104251194          12/2014
JP          2004064838          2/2004
(Continued)

OTHER PUBLICATIONS

Notice of Allowance in Korean Appln. No. 10-2018-0110818, mailed on Mar. 5, 2020, 12 pages (with English translation).
(Continued)

*Primary Examiner* — Philip E Stimpert
(74) *Attorney, Agent, or Firm* — Fish & Richardson P.C.

(57)          ABSTRACT

The present invention relates to a linear motor and a linear compressor. A linear motor according to an idea of the present invention comprises: a first stator; a second stator disposed inside the first stator so as to be movable in an axial direction. The mover includes: a plurality of permanent magnets; a front sub core disposed at the front of the plurality of permanent magnets in the axial direction; and a rear sub core spaced from the front sub core in the axial direction so as to be disposed at the rear of the plurality of permanent magnets in the axial direction, wherein the front sub core and the rear sub core are formed to have the same shape.

8 Claims, 10 Drawing Sheets

(51) Int. Cl.
*F04B 39/00* (2006.01)
*F04B 39/12* (2006.01)
*H02K 16/04* (2006.01)

(58) Field of Classification Search
USPC ................................................. 417/415–417
See application file for complete search history.

(56) References Cited

U.S. PATENT DOCUMENTS

| | | | |
|---|---|---|---|
| 2013/0257180 A1* | 10/2013 | Tang | H02K 21/24 |
| | | | 310/12.18 |
| 2015/0004028 A1* | 1/2015 | Kang | F04B 35/045 |
| | | | 417/417 |
| 2015/0004030 A1 | 1/2015 | Jeong | |
| 2018/0212503 A1 | 7/2018 | Jeong et al. | |
| 2018/0258921 A1 | 9/2018 | Hong et al. | |

FOREIGN PATENT DOCUMENTS

| | | |
|---|---|---|
| JP | 2012151954 | 8/2012 |
| KR | 10-1998-0017655 | 6/1998 |
| KR | 19980084544 | 12/1998 |
| KR | 100195932 | 2/1999 |
| KR | 10-2005-0049270 | 5/2005 |
| KR | 10-0712919 | 5/2007 |
| KR | 101454549 | 10/2014 |
| KR | 20160010985 | 1/2016 |
| KR | 10-2016-0132665 | 11/2016 |

OTHER PUBLICATIONS

Office Action in Chinese Appln. No. 201980073631.7, mailed on Mar. 22, 2023, 20 pages (with English translation).

\* cited by examiner

LINEAR MOTOR AND LINEAR COMPRESSOR

TECHNICAL FIELD

The present invention relates to a linear motor and a linear compressor.

BACKGROUND ART

In general, a compressor corresponds to a mechanical device that receives power from a power generating device such as an electric motor or a turbine to compress various working gases such as air or a refrigerant, thereby increasing in pressure. The compressor is being widely used throughout the home appliance or industry.

Such a compressor includes a reciprocating compressor. In the reciprocating compressor, a compression space, into/from which a working gas is suctioned or discharged, is formed between a piston and a cylinder. In addition, the piston compresses a refrigerant accommodated in the compression space while linearly reciprocating within the cylinder.

The reciprocating compressor includes a linear compressor in which the piston is directly connected to a driving motor (hereinafter, referred to as a linear motor) for linear reciprocating motion. The linear compressor may improve compression efficiency without a mechanical loss due to motion conversion. In addition, the linear compressor has an advantage that it is configured with a simple structure.

In detail, the linear compressor is configured so that the piston linearly reciprocates inside the cylinder by the linear motor. The refrigerant may be suctioned, compressed, and discharged during the reciprocating linear motion of the piston.

At this time, the linear motor includes a stator and a rotor. The rotor is disposed to be movable between the stators spaced apart from each other. In addition, the rotor may linearly reciprocate by mutual electromagnetic force between the stators. In addition, the linear motor may be provided in a device other than the linear compressor or may be configured as a separate device.

A rotor of the linear motor provided in the linear compressor may be provided in a state of being connected to the piston. As the rotor is driven, the piston may suction and compress the refrigerant while linearly reciprocating inside the cylinder.

In relation to the linear compressor including the linear motor, the present applicant has field a prior art document 1.

Prior Art Document 1

1. Patent Publication Number: 10-2016-0010985 (Date of Publication: Jan. 29, 2016)
2. Title of the invention: LINEAR COMPRESSOR AND LINEAR MOTOR The rotor and the piston may linearly reciprocate to compress the refrigerant according to the structure disclosed in the prior art document 1. In detail, the stator includes a first stator and a second stator, which are disposed to be spaced apart from each other. In addition, the rotor includes a permanent magnet movably disposed between the first stator and the second stator.

At this time, the permanent magnet is made of a relatively expensive material. That is, the usage of the permanent magnet may have a relatively large influence on costs of the linear motor. At this time, if the usage of the permanent magnet is reduced to reduce the costs, there is a problem in that an output of the linear motor is reduced.

In order to improve the output of the linear motor, the usage of the permanent magnet has to increase. Accordingly, there is a problem that the costs of the linear motor increase.

DISCLOSURE OF THE INVENTION

Technical Problem

The present invention has been proposed in order to solve such a problem, and an object of the present invention is to provide a linear compressor provided with a permanent magnet and a sub core, which is disposed on each of both sides of the permanent magnet, in a rotor to improve an output.

In addition, it is an object to provide a linear motor and a linear compressor, which maintain an output by using a sub core and reduce usage of a permanent magnet to reduce costs.

Technical Solution

The linear motor according to ideas of the present invention includes a first stator, a second stator disposed inside the first stator, and a rotor disposed to be movable in an axial direction between the first stator and the second stator.

Here, the rotor includes a plurality of permanent magnets, a front sub core disposed in front of each of the plurality of permanent magnets in the axial direction, and a rear sub core spaced apart from the front sub core in the axial direction, the rear sub core being disposed behind each of the plurality of permanent magnets in the axial direction.

Here, the front sub core and the rear sub core have the same shape.

In addition, each of the plurality of permanent magnets may have a circumferential length $L1$ in a circumferential direction, and the permanent magnets adjacent to each other may be disposed to be spaced an interval length $G1$ from each other in the circumferential direction. Here, the interval length $G1$ may be greater than the circumferential length $L1$.

In addition, the rotor may have a first axial length $H1$ in the axial direction, and the first stator and the second stator may have a second axial length $H2$ and a third axial length $H3$ in the axial direction, respectively. Here, the first axial length $H1$ may be greater than the second axial length $H2$ and less than the third axial length $H3$.

In addition, a linear compressor according to ideas of the present invention includes a cylinder in which a piston reciprocating in an axial direction is accommodated, a frame provided with a frame body, in which the cylinder is accommodated, and a frame flange extending radially from a front portion of the frame body in an axial direction, and a linear motor.

The linear motor includes a first stator disposed behind the frame flange in the axial direction, a second stator disposed inside the first stator, the second stator being fixed to the outside of the frame body, and a rotor disposed between the first stator and the second stator, the rotor being connected to the piston.

Also, the rotor may include a plurality of permanent magnets and a sub core disposed at each of front and rear sides of the permanent magnets in the axial direction.

Advantageous Effects

According to the present invention, there may be an advantage in that the sub core is provided to maintain the usage of the permanent magnet as it is, and the outputs of the linear motor and the linear compressor including the same are improved.

Accordingly, there may be an advantage that the linear motor operates at the higher speed, and the compression efficiency of the linear compressor increases.

In addition, since the linear motor and the linear compressor are formed to be smaller, there may be an advantage in that the degree of freedom of installation increases. In addition, there may be an advantage in that the space utilization increases by minimizing the space in which the linear motor and the linear compressor are installed.

There may be an advantage that the outputs of the linear motor and the linear compressor including the same are maintained as it is, and the usage of the relatively expensive permanent magnets is reduced by providing the sub core.

Therefore, there may be an advantage in that the costs including the material costs are reduced, and the price competitiveness secured by providing the more inexpensive linear motor and the linear compressor having the same.

BRIEF DESCRIPTION OF THE DRAWINGS

FIGS. 3 and 4 are views illustrating an operation of the linear compressor according to an embodiment of the present invention.

FIG. 6 is an exploded view of the linear motor according to an embodiment of the present invention.

MODE FOR CARRYING OUT THE INVENTION

Figure 1:
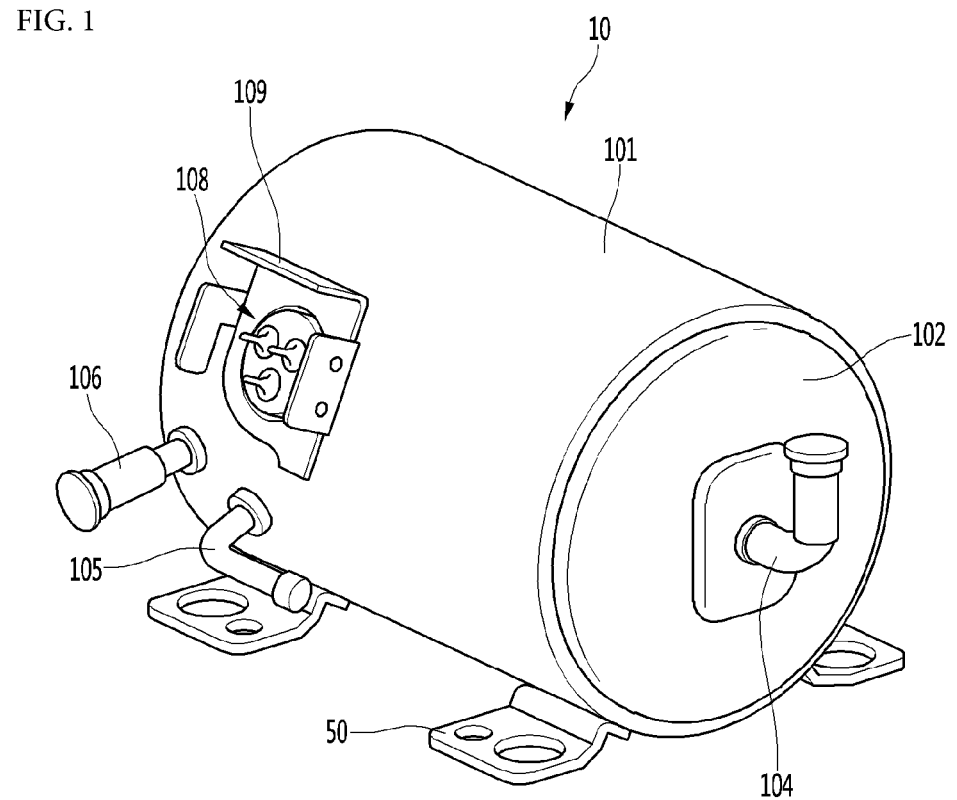
FIG. 1 is a view of a linear compressor according to an embodiment of the present invention.

Hereinafter, some embodiments of the present invention will be described in detail with reference to the accompanying drawings. It is noted that the same or similar components in the drawings are designated by the same reference numerals as far as possible even if they are shown in different drawings. In the following description of the present invention, a detailed description of known functions and configurations incorporated herein will be omitted to avoid making the subject matter of the present invention unclear.

In the description of the elements of the present invention, the terms first, second, A, B, (a), and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

FIG. 1 is a view of a linear compressor according to an embodiment of the present invention.

As illustrated in FIG. 1, a linear compressor 10 according to the ideas of the present invention includes a shell 101 and a shell cover 102 coupled to the shell 101.

Both sides of the shell 101 may be opened. The shell cover 102 may be coupled to each of both sides of the opened shell 101. An inner space of the shell 101 may be sealed by the shell cover 102. In a broad sense, the shell cover 10 may be understood as one component of the shell 101.

A leg 50 may be coupled to a lower portion of the shell 101. The leg 50 may be coupled to a base of a product in which the linear compressor 10 is installed. For example, the product may include a refrigerator, and the base may include a machine room base of the refrigerator. For another example, the product may include an outdoor unit of an air conditioner, and the base may include a base of the outdoor unit.

The shell 101 may have an approximately cylindrical shape and be disposed to lie in a horizontal direction or an axial direction. In FIG. 1, the shell 101 may extend in the horizontal direction and have a relatively low height in a radial direction. That is, since the linear compressor 10 has a low height, when the linear compressor 10 is installed in the machine room base of the refrigerator, a machine room may be reduced in height.

A terminal 108 may be installed on an outer surface of the shell 101. The terminal 108 may be understood as a component for transmitting external power to the linear compressor. In detail, the terminal 108 may be connected to a stator to be described later.

A bracket 109 is installed outside the terminal block 108. The bracket 109 may include a plurality of brackets surrounding the terminal 108. The bracket 109 may protect the terminal block 108 against an external impact and the like.

The linear compressor 10 further includes a plurality of pipes 104, 105, and 106, which are provided in the shell 101 or the shell cover 102 to suction, discharge, or inject the refrigerant. The plurality of pipes 104, 105, and 106 include a suction pipe 104, a discharge pipe 105, and a process pipe 106.

The suction pipe 104 is provided so that the refrigerant is suctioned into the linear compressor 10. For example, the suction pipe 104 may be coupled to a center side of the shell cover 102 in an axial direction to be described later. Thus, the refrigerant may be suctioned into the linear compressor 10 along the suction pipe 104 in the axial direction.

Particularly, the suction pipe 104 may be installed on the shell 101 so as to be integrated with a central axis C1 of a piston 130 to be described later. Thus, the refrigerant introduced in the axial direction through the suction pipe 104 may be introduced into the piston 130 and then compressed without being changed in flow direction. Thus, it is possible to prevent a flow loss such as a decrease in flow rate of the suction refrigerant from occurring.

The discharge pipe 105 is provided so that the compressed refrigerant is discharged from the linear compressor 10. The discharge pipe 105 may be coupled to an outer circumferential surface of the shell 101. The refrigerant suctioned through the suction pipe 104 may be compressed while flowing in the axial direction, and the compressed refrigerant may be discharged through the discharge pipe 105.

The process pipe 106 may be provided to supplement the refrigerant into the linear compressor 10. The process pipe 106 may be coupled to an outer circumferential surface of the shell 101. A worker may inject the refrigerant into the linear compressor 10 through the process pipe 106.

Here, the process pipe 106 may be coupled to the shell 101 at a height different from that of the discharge pipe 105 to avoid interference with the discharge pipe 105. The height is understood as a distance from the leg 50 in a vertical direction (or the radial direction). Since the discharge pipe 105 and the process pipe 106 are coupled to the outer circumferential surface of the shell 101 at the heights different from each other, worker's work convenience may be improved.

At least a portion of the shell cover 102 may be disposed adjacent to the inner circumferential surface of the shell 101, which corresponds to a point to which the process pipe 106 is coupled. That is, at least a portion of the shell cover 102 may act as flow resistance of the refrigerant injected through the process pipe 106.

Thus, in view of the passage of the refrigerant, the passage of the refrigerant introduced through the process pipe 106 may have a size that gradually decreases toward the inner space of the shell 101. In this process, the refrigerant may decrease in pressure to evaporate the refrigerant.

Also, in this process, an oil component contained in the refrigerant may be separated. Thus, the gas refrigerant from which the oil component is separated may be introduced into the piston 130 to improve compression performance of the refrigerant. Here, the oil component may be understood as working oil existing in a cooling system.

Such an outer appearance of the linear compressor 10 is merely an example. Thus, the linear compressor 10 according to the ideas of the present invention may be provided in various shapes. Hereinafter, an internal configuration of the linear compressor 10 will be described.

Figure 2:
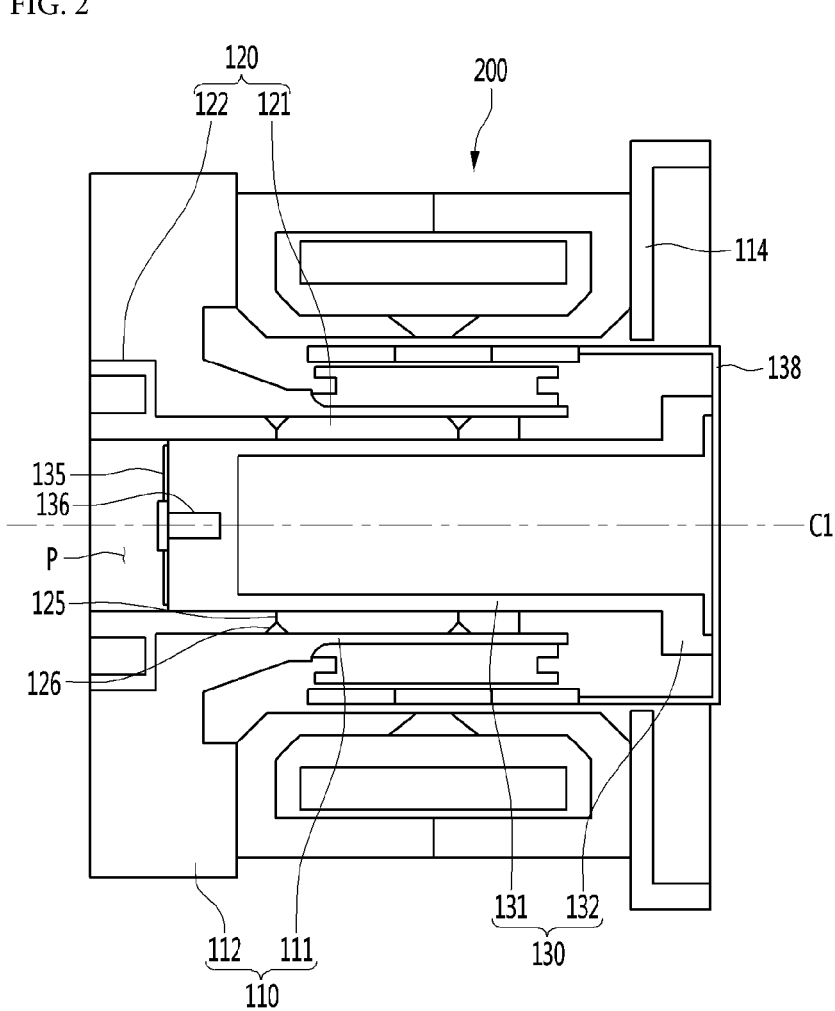
FIG. 2 is a schematic view illustrating the inside of the linear compressor according to an embodiment of the present invention.

FIG. 2 is a schematic view illustrating the inside of the linear compressor according to an embodiment of the present invention. In detail, FIG. 2 schematically illustrates the inside of the shell 101 illustrated in FIG. 1, and the external configuration including the shell 101 is omitted.

Referring to FIG. 2, the linear compressor 10 according to the ideas of the present invention may include a frame 110, a cylinder 120, a piston 130, and a linear motor 200.

The linear motor 200 may correspond to a component that applies driving force to the piston 130, and the piston may reciprocate by the driving of the linear motor 200. The linear motor 200 will be described below in detail.

Hereinafter, the direction will be defined.

The "axial direction" may be understood as a direction in which the piston 130 reciprocates, i.e., a horizontal direction in FIG. 2. Particularly, the piston 130 may reciprocate based on the central axis C1 extending in the axial direction.

Also, in the axial direction", a direction from the suction pipe 104 toward a compression space P, i.e., a direction in which the refrigerant flows may be defined as a "forward direction", and a direction opposite to the front direction may be defined as a "backward direction". When the piston 130 moves forward, the compression space P may be compressed.

On the other hand, the "radial direction" may be understood as a direction that is perpendicular to the direction in which the piston 130 reciprocates, i.e., the vertical direction in FIG. 2. Also, in the "radial direction", a direction from a central axis of the piston 130 toward the shell 101 may be defined as "the outside" in the radial direction, and the opposite direction may be defined as "the inside" in the radial direction.

The frame 110 includes a frame body 111 extending in the axial direction and a frame flange 112 extending outward from the frame body 111 in the radial direction. Here, the frame body 111 and the frame flange 112 may be integrated with each other.

The frame body 111 has a cylindrical shape of which upper and lower ends in the axial direction are opened. The cylinder 120 is accommodated inside the frame body 111 in the radial direction. That is, the frame 110 may be understood as a component for fixing the cylinder 120. For example, the cylinder 120 may be press-fitted into the frame 110.

The frame flange 112 have a circular plate shape having a predetermined thickness in the axial direction. Particularly, the frame flange 112 extends from a front end of the frame body 111 in the radial direction.

Also, the frame 110 may be provided with a gas passage (not shown) extending to pass through the frame flange 112 and the frame body 111. At least a portion of the refrigerant flows through the gas passage, which may correspond to a bearing refrigerant. The bearing refrigerant may flow outside the cylinder 120 and the piston 130 to function as a bearing.

The cylinder 120 includes a cylinder body 121 extending in the axial direction and a cylinder flange 122 disposed outside a front portion of the cylinder body 121.

The cylinder body 121 has a cylindrical shape with a central axis in the axial direction and is inserted into the frame body 111. Thus, an outer circumferential surface of the cylinder body 121 may be disposed to face an inner circumferential surface of the frame body 111.

The cylinder flange 122 may extend radially outward from a front portion of the cylinder body 121 to extend forward. While the cylinder 120 is accommodated in the frame 110, the cylinder flange 122 may be deformed. Also, the cylinder 120 may be fixed to the frame 110 by restoring force of the cylinder flange 122.

The cylinder body 121 includes a gas inflow portion 126 formed to be recessed radially inward from the outer circumferential surface of the cylinder body 121. Also, the gas inflow portion 126 may have a circular shape along the outer circumferential surface of the cylinder body 121 with respect to the central axis in the axial direction. The gas inflow portion 126 may be provided in plurality. For example, as illustrated in FIG. 2, two gas inflow portions 126 may be provided.

Also, the cylinder body 121 further includes a cylinder nozzle 125 extending inward from the gas inflow portion 126 in the radial direction. The cylinder nozzle 125 may extend up to the inner circumferential surface of the cylinder body 121. That is, the cylinder nozzle 125 extends up to the outside of the piston 130 accommodated inside the cylinder body 121.

Due to this structure, the bearing refrigerant may be supplied to the piston 130. In detail, the bearing refrigerant passes through the frame 110 and is supplied to the outside of the cylinder 120. Also, the bearing refrigerant may be supplied to the piston 130 through the gas inflow portion 126 and the cylinder nozzle 125.

However, this is merely an example, and the linear compressor 10 according to the ideas of the present invention may be driven by an oil bearing.

The piston 130 is movably accommodated in the cylinder 120. A compression space P in which the refrigerant is compressed by the piston 130 is formed inside the cylinder 120 in front of the piston 130.

The piston 130 includes an approximately cylindrical piston body 131 and a piston flange 132. At least a portion of the piston body 131 is disposed to be accommodated in the cylinder body 121. The piston flange 132 extends radially outward from a rear portion of the piston body 131.

Here, the piston flange 132 is disposed outside the cylinder 120. Thus, the piston body 131 may reciprocate inside the cylinder 120, and the piston flange 132 may reciprocate outside the cylinder 120.

Also, a suction hole (not shown) through which the refrigerant is introduced into the compression space P and a suction valve 135 for opening and closing the suction hole are disposed on a front surface of the piston 130. The suction valve 135 may be coupled to the piston 130 by a coupling member 136.

Also, although omitted for convenience of description, various devices are further provided in the linear compressor 10. For example, the linear compressor 10 is provided with a discharge unit (not shown) for allowing the refrigerant discharged from the compression space P to flow into the shell 101. Also, the linear compressor 10 may further include a muffler for reducing noise generated from the refrigerant suctioned through the suction pipe 104 and a support device for supporting each component inside the shell 101.

With reference to this configuration, an operation of the linear compressor 10 will be described in detail.

Figure 3:
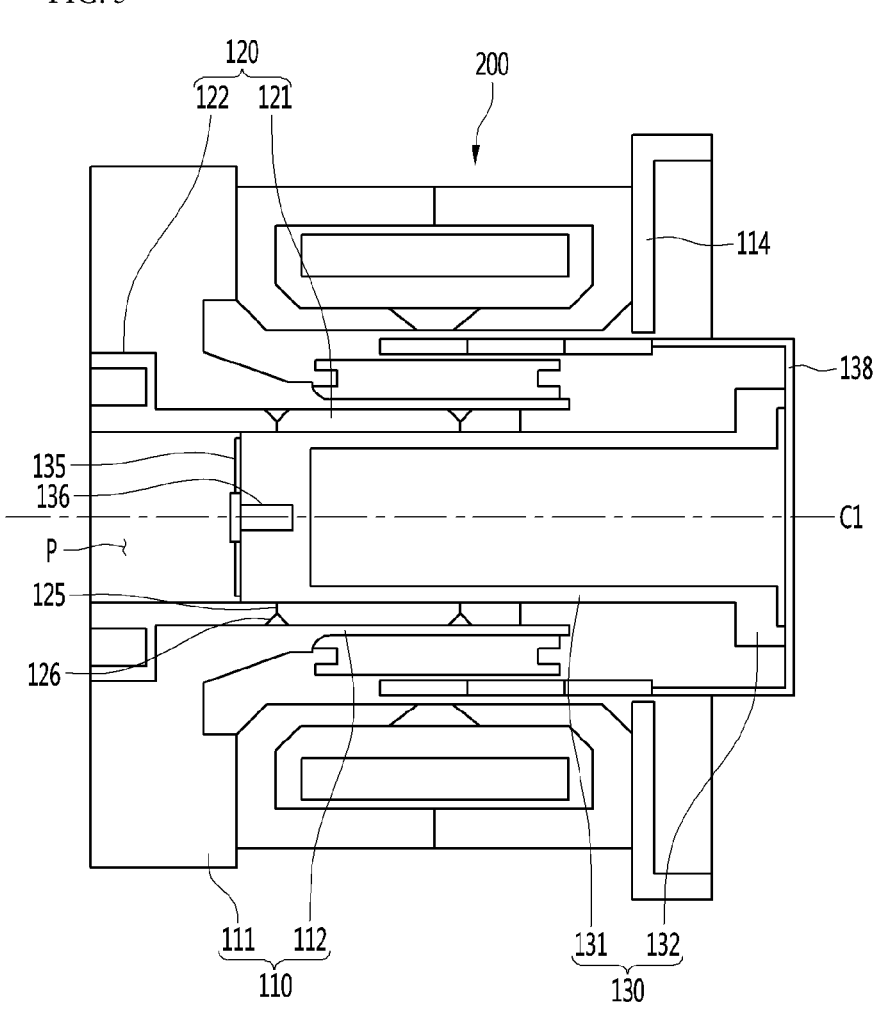
Figure 4:
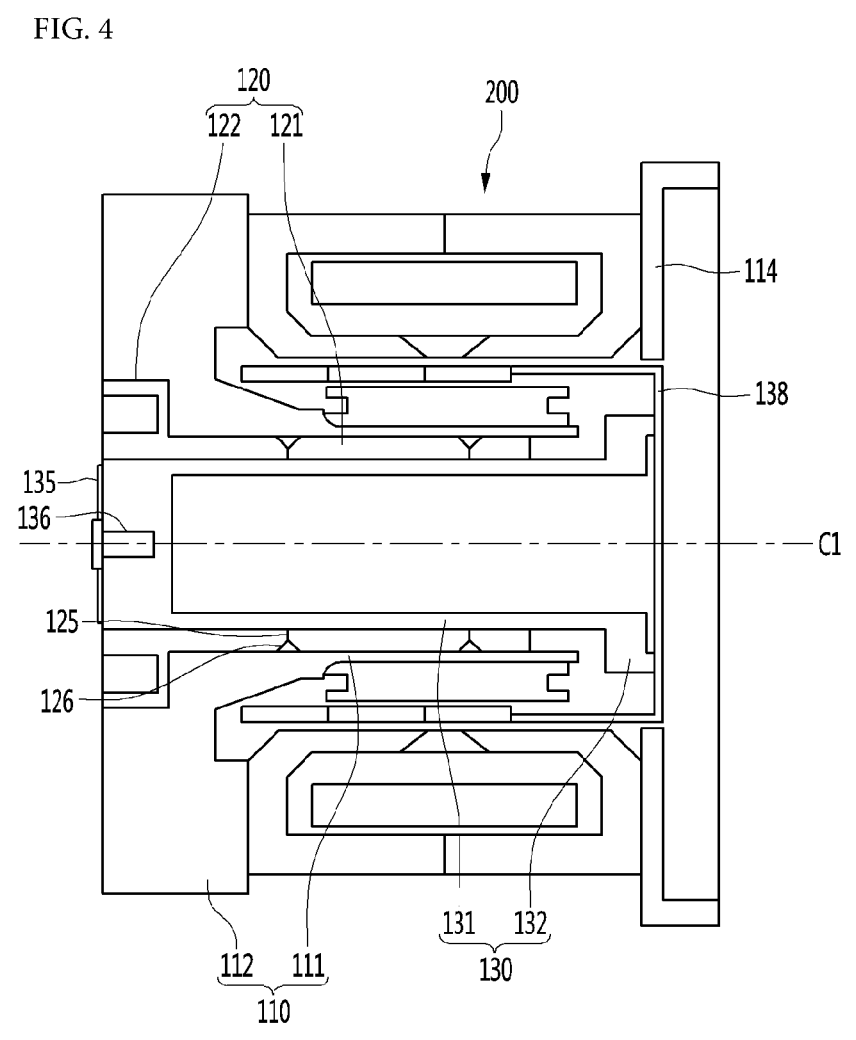

FIGS. 3 and 4 are views illustrating an operation of the linear compressor according to an embodiment of the present invention.

As illustrated in FIGS. 3 and 4, the piston 130 may linearly move in the horizontal direction in the drawings, i.e., in the axial direction. Particularly, the piston 130 may linearly reciprocate within a range of a bottom dead center (BDC) to a top dead center (TDC).

FIG. 3 illustrates a case in which the piston 130 is disposed at the bottom dead center, and FIG. 4 illustrates a case in which the piston 130 is disposed at the top dead center. However, this is merely an example, and the positions of the bottom dead center and the top dead center may be changed according to a design.

When the piston 130 moves from the position of FIG. 4 to the position of FIG. 3, the suction valve 135 is opened so that the refrigerant is suctioned into the compression space P. That is, the piston 130 moves backward in the axial direction, and the refrigerant flows forward in the axial direction to be accommodated in the compression space P.

Here, the refrigerant t introduced into the suction pipe 104 passes through the piston 130 to flow into the compression space P. As described above, since the suction pipe 104 is disposed coaxially or parallel to the piston 130 in the axial direction, the flow loss of the refrigerant may be minimized.

Also, in this process, the suction valve 135 is bent forward, and the refrigerant is discharged forward from the inside of the piston 130. For convenience of description, the modification of the suction valve 135 is not separately illustrated in the drawings.

Also, when the piston 130 reaches the bottom dead center as illustrated in FIG. 3, the piston 130 moves forward in the axial direction. Accordingly, the refrigerant accommodated in the compression space P may be compressed. That is, when the piston 130 moves from the position of FIG. 3 to the position of FIG. 4, the refrigerant accommodated in the compression space P may be compressed.

Here, the suction valve 135 is disposed in close contact with the front portion of the piston 130. Thus, the compression space P is closed so that the refrigerant is compressed.

Also, when the piston 130 reaches the top dead center as illustrated in FIG. 4, the piston 130 moves backward in the axial direction. Thus, as described above, the refrigerant may flow into the compression space P. Also, the compressed refrigerant may be discharged from the compression space P.

As described above, the piston 130 may linearly reciprocate to compress the refrigerant. Here, the piston 130 may reciprocate by the linear motor 200. Hereinafter, the linear motor 200 will be described in detail.

Figure 5:
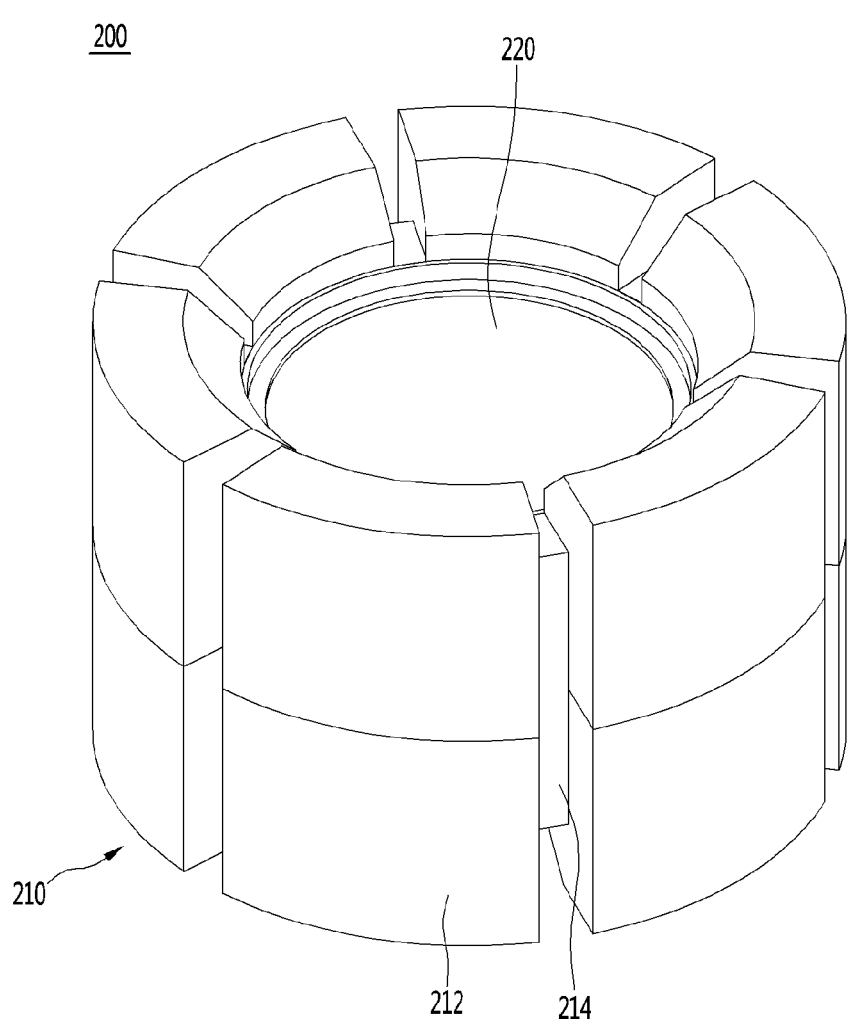
FIG. 5 is a view of a linear motor according to an embodiment of the present invention.
Figure 6:
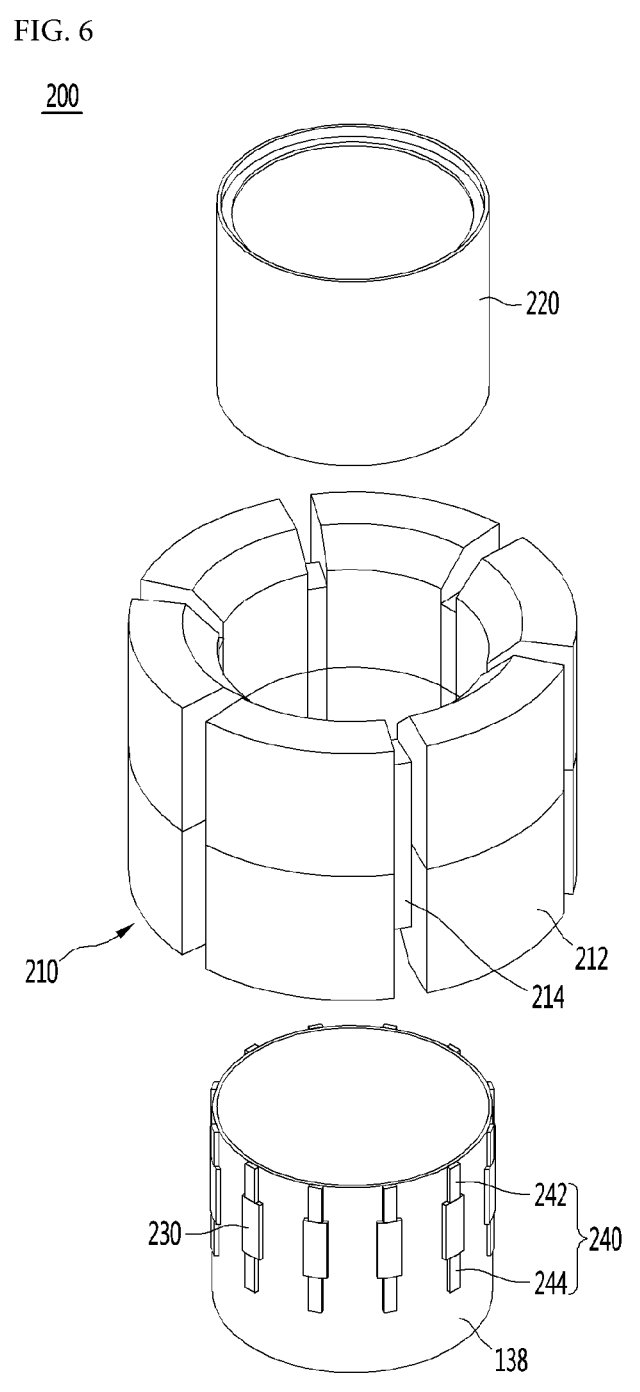

FIG. 5 is a view of the linear motor according to an embodiment of the present invention, and FIG. 6 is an exploded view of the linear motor according to an embodiment of the present invention.

As illustrated in FIGS. 5 and 6, the linear motor 200 includes stators 210 and 220 and a rotor 230 and 240. Also, referring to FIGS. 2 to 4, the linear motor 200 is disposed outside the frame body 111 in the radical direction and disposed behind the frame flange 112 in the axial direction.

The stator includes a first stator 210 and a second stator 220 disposed inside the first stator 220. Here, the first stator 210 may be referred to as an outer stator, and the second stator 220 may be referred to as an inner stator.

The first stator 210 includes a stator core 212 and a coil winding body 214.

The stator core 212 includes a plurality of core blocks in which a plurality of laminations are laminated in a circumferential direction. The plurality of core blocks may be disposed to surround at least a portion of the coil winding body 214. Here, the stator core 212 may also be understood as a component forming an outer appearance of the first stator 210.

Here, as illustrated in FIGS. 5 and 6, the stator core 212 may be provided in a plurality, which are spaced apart from each other in the circumferential direction. This is done for avoiding necessity of the design or a cover coupling member to be described later. Six stator cores 212 spaced apart from each other in the circumferential direction are illustrated in FIGS. 5 and 6, but this is merely an example.

The coil winding body 214 may be understood as a bundle of coils wound in a circumferential direction. Also, the coil winding body 214 may be provided with a bobbin for fixing the coil in a predetermined shape.

Also, the coil winding body 214 further includes a terminal portion (not shown) for guiding a power line connected to the coil so as to be drawn out or exposed to the outside of the linear motor 200. The terminal portion may pass through the frame flange 112 and then pass forward from a rear side to the frame 110 so as to be drawn out or exposed to the outside. Also, the terminal portion may be connected to the terminal 108 so as to be connected to an external power source.

The second stator 220 is configured by laminating the plurality of laminations in the circumferential direction. Here, the second stator 220 may be provided in a cylindrical shape that is penetrated in the axial direction as a whole.

Referring to FIG. 2, the first stator 210 and the second stator 220 are disposed to be fixed to the frame 110. Particularly, the first stator 210 is fixed to the frame flange 112, and the second stator 220 is fixed to the frame body 111.

In detail, the second stator 220 is fixed to an outer circumferential surface of the frame body 111. Also, the second stator 220 is formed by being laminated on the frame body 111 in the circumferential direction. That is, the second stator 220 is fixed and disposed outside the frame body 111 in the radial direction.

The first stator 210 is disposed between the frame flange 112 and the stator cover 114 (see FIG. 2) in the axial direction. In detail, the first stator 210 is disposed so that a front portion thereof in the axial direction is in contact with the frame flange 112, and a rear portion thereof in the axial direction is in contact with the stator cover 114.

Here, the linear compressor 10 further includes a cover coupling member (not shown) for coupling the stator cover 114 to the frame 110. The cover coupling member may pass through the first stator 210 to couple the stator cover 114 to the frame 110. Accordingly, the first stator 210 may be fixed between the stator cover 114 and the frame 110.

The rotor 230 and 240 is disposed between the first stator 210 and the second stator 220. In detail, the first stator 210 and the second stator 220 are disposed to be spaced apart from each other in the radial direction, and the rotor 230 and 240 is disposed between the first stator 210 and the second stator 220 in the radial direction.

In summary, in the linear motor 200, the second stator 220, the rotor 230 and 240, and the first stator 210 are sequentially disposed inward from inside in the radial direction. Also, in the linear compressor 10, the piston 130, the cylinder 120, the frame 110, and the linear motor 200 are sequentially disposed outward from inside in the radial direction.

Also, the rotor 230 and 240 is disposed to be movable in the axial direction between the first stator 210 and the second stator 220. Particularly, the rotor 230 and 240 linearly reciprocates in the axial direction within the range of the top dead center and the bottom dead center of the piston 130.

The rotor includes a permanent magnet 230 and a sub core 240 disposed at at least one side of the permanent magnet 230.

The permanent magnet 230 may reciprocate linearly by mutual electromagnetic force between the first stator 210 and the second stator 220. Also, the permanent magnet 230 may be provided as a single magnet having one polarity or be provided by coupling a plurality of magnets having three polarities to each other.

For example, the permanent magnet 230 may be provided with a rare earth magnet. The rare earth magnet may be relatively more expensive than a general permanent magnet such as a ferrite magnet and may generate a large output. Thus, usage of the permanent magnet 230 may have a relatively large influence on the linear motor 200 and d the linear compressor 10.

Also, the linear compressor 10 may include the magnet frame 138 (see FIG. 2) connecting the permanent magnet 230 to the piston 130. The magnet frame 138 has a cylindrical shape which is penetrated substantially in the axial direction. Also, the magnet frame 138 may be disposed so that at least a portion of the magnet frame 138 is inserted into a space between the first stator 210 and the second stator 220.

In detail, referring to FIG. 2, the magnet frame 138 may extend radially outward from the piston flange 132 and be provided to be bent forward in the axial direction. Here, the permanent magnet 230 may be installed on a front portion of the magnet frame 138. Thus, when the permanent magnet 230 reciprocates, the piston 130 may reciprocate together with the permanent magnet 230 in the axial direction.

Also, when the linear motor 200 is provided as a separate device or installed in another device, the magnet frame 138 may be omitted or connected to a component rather than the permanent magnet 230.

The sub core 240 may be coupled to the magnet frame 138 together with the permanent magnet 230. In detail, the permanent magnet 230 and the sub core 240 may be attached to an outer circumferential surface of the magnet frame 138 and may be fixed by a coupling member such as a composite tape.

The sub core 240 functions to increase in back electromotive force constant of the linear motor 200 by an increase in magnetic flux interlinkage. That is, the output of the linear motor 200 may increase by the sub core 240. In other words, it is possible to maintain the same output by the sub core 240 and reduce the usage of the permanent magnet 230.

The sub core 240 is made of an electrical steel sheet having high magnetic permeability or a material similar thereto. For example, the sub core 240 may be made of an electrical steel sheet (iron, silicon, or the like) or a soft magnetic composite (SMC).

Particularly, the sub core 240 may be disposed at front and rear sides of the permanent magnet 230 in the axial direction, respectively. That is, the sub core 240 may be provided in a plurality, which are spaced apart from each other in the axial direction.

In other words, the sub core 240 may include a front sub core 242 disposed in front of the permanent magnet 230 in the axial direction and a rear sub core 244 disposed behind the permanent magnet 230 in the axial direction. Here, the front sub core 242 and the rear sub core 244 have the same shape.

The front sub core 242 and the rear sub core 244 may be spaced apart from each other in the axial direction by an axial length of the permanent magnet 230. That is, the front sub core 242 and the rear sub core 244 are disposed so that one end of each of the front sub core 242 and the rear sub core 244 is in close contact with the permanent magnet 230. In detail, a rear end of the front sub core 242 is in close contact with a front end of the permanent magnet 230, and a front end of the rear sub core 244 is in close contact with a rear end of the permanent magnet 230.

In other words, the front sub core 242, the permanent magnet 230, and the rear sub core 244 are connected to be sequentially disposed in the axial direction. Such a structure may more effectively increase in output of the linear motor 200.

The front sub core 242 and the rear sub core 244 may be spaced apart from each other in the axial direction by a length that is longer than the axial length of the permanent magnet 230. That is, the front sub core 242 and the rear sub core 244 may be disposed so that one end of the front sub core 242 and the rear sub core 244 is spaced apart from the permanent magnet 230.

In other words, the front sub core 242, the permanent magnet 230, and the rear sub core 244 are spaced to be sequentially disposed in the axial direction. Such a structure may reduce the usage of the sub core 240. Thus, an overall weight of the rotor 230 and 240 may be reduced, material costs may be reduced, and a high-speed operation may be possible.

Hereinafter, the structure of the linear motor 200 including the sub core 240 will be described in detail.

Figure 7:
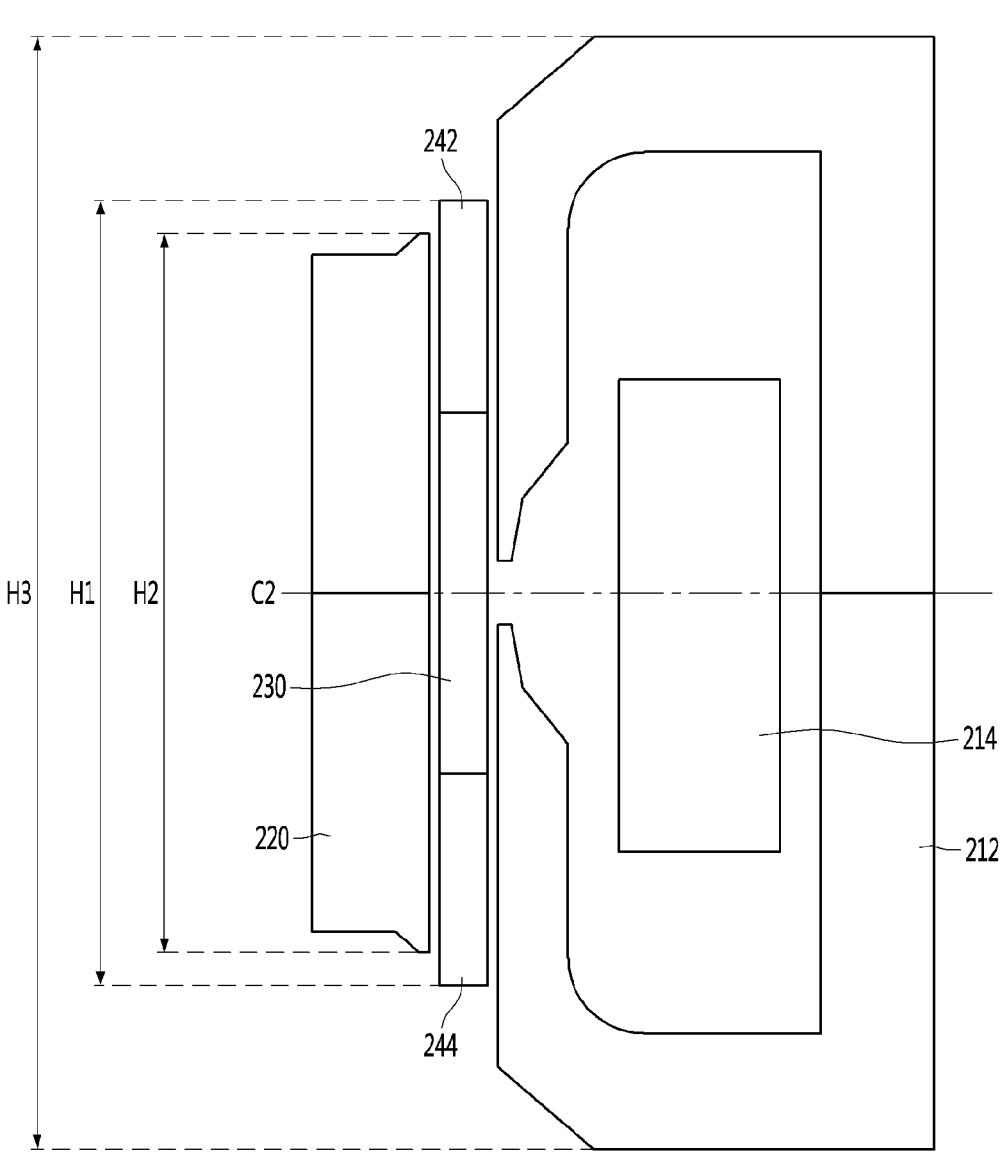
FIG. 7 is a cross-sectional view of the linear motor according to an embodiment of the present invention.

FIG. 7 is a cross-sectional view of the linear motor according to an embodiment of the present invention. FIG. 7 is a cross-sectional view illustrating one side of the linear motor 200 that is cut in the axial direction. For convenience of explanation, the magnet frame 138 fixing the rotor 230 and 240 is omitted.

As illustrated in FIG. 7, the second stator 220, the rotor 230 and 240, and the first stator 210 are sequentially disposed in the radial direction. A left side in the drawing corresponds to the inside in the radial direction, and the cylinder 120 and the piston 130 may be disposed at the left side of the second stator 220. Also, a right side in the drawing corresponds to the outside in the radial direction, and the shell 101 may be disposed at the right side of the first stator 210.

Also, the second stator 220, the rotor 230 and 240, and the first stator 210 extend in the axial direction based on the central axis C2 extending in the radial direction. That is, upper and lower portions of the second stator 220, the rotor 230 and 240, and the first stator 210 may have the same shape in the axial direction based on the central axis C2.

However, depending on the design, the central axes C2 of the second stator 220, the rotor 230 and 240, and the first stator 210 may be slightly different from each other. For convenience of explanation, this is described without consideration.

In this case, the position of the rotor 230 and 240 correspond to a position when the linear motor 200 does not operate. In other words, the piston 130 is disposed at a center of the top dead center and the bottom dead center.

Each of the second stator 220, the rotor 230 and 240, and the first stator 210 has an axial length. Also, the axial length is provided equally at upper and lower sides based on the central axis C2. Hereinafter, the axial length of the rotor 230 and 240 is referred to as a first axial length H1.

As described above, the sub core 240 is disposed at the front and rear sides of the permanent magnet 230 in the axial direction. Thus, a first axial length H1 may be understood as an axial length from the front end of the front sub core 242 to the rear end of the rear sub core 244.

Also, the axial length of the second stator 220 is referred to as a second axial length H2, and the axial length of the first stator 210 is referred to as a third axial length H3. The third axial length H3 may be understood as an axial length of the stator core 212.

As illustrated in FIG. 7, the first shaft length H1, the second shaft length H2, and the third shaft length H3 are provided to lengths different from each other. Also, the first shaft length H1 is greater than the second shaft length H2 and less than the third shaft length H3 (H2<H1<H3).

Here, the permanent magnet 230 may reciprocate in the axial direction within a range of the second shaft length H2. That is, the permanent magnet 230 is not disposed at the front or rear side of the second stator 220 in the axial direction.

That is to say, a case in which the permanent magnet 230 moves as far forward as possible, i.e., a case in which the piston 130 is disposed at the top dead center, will be described with reference to FIG. 4. Here, the front end of the permanent magnet 230 is the same as the front end of the second stator 220 or is disposed at the rear side.

Also, referring to FIG. 3, a case in which the permanent magnet 230 moves as far rearward as possible, i.e., a case in which the piston 130 is disposed at the bottom dead center, will be described. The rear end of the permanent magnet 230 is the same as the rear end of the second stator 220 or is disposed at the front side.

Here, at least a portion of the sub core 240 may be disposed at the front or rear side of the second stator 220. In other words, at least a portion of the rotor 230 and 240 may be disposed at the front or rear sides of the second stator 220. This is done because the sub core 240 serving as an auxiliary function is provided in the rotor 230 and 240.

As described above, the usage of the permanent magnet 230 may be reduced by the sub core 240. Hereinafter, this will be described in detail.

Figure 8:
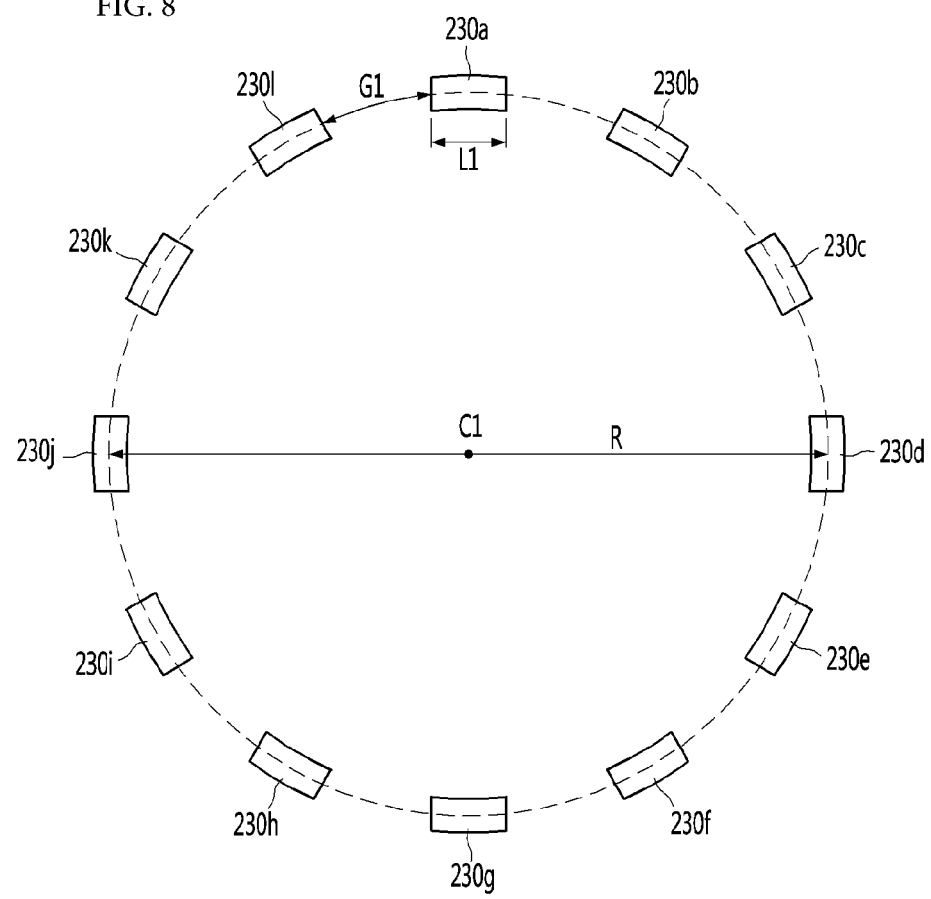
FIG. 8 is a view illustrating a permanent magnet of the linear motor according to an embodiment of the present invention.

FIG. 8 is a view illustrating the permanent magnet of the linear motor according to an embodiment of the present invention. FIG. 8 illustrates the permanent magnet 230 in the axial direction, and other component such as the sub core 240 and a structure for fixing the permanent magnet 230 are omitted.

As illustrated in FIG. 8, the permanent magnet 230 may be provided in plurality, which are spaced apart from each other in the circumferential direction. Particularly, the plurality of permanent magnets 230 may be arranged in a circular shape.

Thus, the plurality of permanent magnets 230 may form one virtual circle having a predetermined diameter R. Here, a center of the virtual circle corresponds to the central axis C1. Also, the diameter R may be understood as a length of each of extending radial center lines of the plurality of permanent magnets 230.

Each of the permanent magnets 230 may be provided in a rectangular shape having a predetermined thickness in the radial direction. Here, a radial length, i.e., a thickness of each of the permanent magnets 230 is related to formation of magnetic fields with the stators 210 and 220. Thus, the radial length or thickness of each of the permanent magnets 230 is provided in a fixed state according to the design.

Also, each of the permanent magnets 230 has a predetermined length in the axial direction. As described above, the permanent magnet 230 moves within a range of an axial length of the second stator 220. Thus, the axial length of the permanent magnet 230 is related to a moving distance of the permanent magnet 230.

Also, the moving distance of the permanent magnet 230 is related to the top dead center and the bottom dead center of the piston 130. That is, an overall arrangement of the linear compressor 10 may be affected. Thus, the axial length of each of the permanent magnets 230 is provided in a fixed state according to the design.

As a result, the permanent magnet 230 of the linear motor 200 according to the ideas of the present invention may have a small circumferential length by the sub core 240. In other words, as the sub core 240 is disposed, a length of the permanent magnet 230 in the circumferential direction may be reduced at the same output. As a result, the usage of the permanent magnet 230 is reduced to reduce the costs.

The plurality of permanent magnets 230 may be spaced the same interval in the circumferential direction and provided in plurality. For example, as illustrated in FIG. 8, a total of 12 permanent magnets 230 may be provided. Hereinafter, the permanent magnet disposed at an upper end in FIG. 8 is referred to as a first permanent magnet 230a, and other permanents are referred to as a second permanent magnet 230b and a third permanent magnet 230c to twelfth permanent magnet 230l, respectively, in a clockwise direction.

Each of the permanent magnets 230 has a circumferential length L1 in the circumferential direction. That is, each of the first to twelfth permanent magnets 230a to 230l has a circumferential length L1.

Also, each of the permanent magnets 230 is disposed to be spaced an interval length G1 from the permanent magnet 230, which is adjacent thereto in the circumferential direction, in the circumferential direction. For example, the first permanent magnet 230a is disposed to be spaced the interval length G1 from the second permanent magnet 230b in the clockwise direction. Also, the first permanent magnet 230a is disposed to be spaced the interval length G1 from the twelfth permanent magnet 230l in a counterclockwise direction.

As illustrated in FIG. 8, each of the circumferential length L1 and the interval length G1 may be a length of an arc. Here, when the circumferential length L1 and the interval length G1 of the plurality of permanent magnets 230 are summed, the sum of the lengths may correspond to a circumference (R*n) of the virtual circle.

Also, each of the circumferential length L1 and the interval length G1 may correspond to a linear distance corresponding to the shortest distance. That is, the permanent magnets 230 has the same length in the circumferential direction and is spaced at the same interval from each other, regardless of a method for measuring each of the lengths.

Here, in the permanent magnet 230 of the linear motor 200 according to the ideas of the present invention, the interval length G1 may be greater than the circumferential length L1. This may be understood as a characteristic that occurs when the circumferential length L1 of the permanent magnet 230 is shortened by the sub core 230.

For example, the circumferential length L1 may be provided to 5 mm, and the interval length G1 may be provided within a range of 5.5 mm to 8.5 mm. In summary, the interval length G1 may be provided at 1.1 times to 1.7 times the circumferential length L1. However, this is a value that is changed by the design and is not limited thereto.

As described above, the permanent magnet 230 according to the ideas of the present invention may be provided in various shapes. Also, the sub core 240 according to the ideas of the present invention may also be provided in various shapes. Hereinafter, various embodiments of the sub core 240 will be described.

FIGS. 9 to 12 are views illustrating a permanent magnet and a sub core of a linear motor according to first to fourth embodiments of the present invention. In FIGS. 9 to 12, a permanent magnet 230 is illustrated identically, and only a sub core 240 is deformed. However, this is merely an example, and both the permanent magnet 230 and the sub core 240 may be deformed according to a design.

Also, the permanent magnet 230 and the sub core 240 are attached to a predetermined installation member such as a magnet frame 138 together. Thus, the permanent magnet 230 and the sub core 240 share the same inner surface.

Also, the permanent magnet 230 and the sub core 240 may be provided to have the same thickness in a radial direction. However, this is merely an example, and the permanent magnet 230 and the sub core 240 may be provided to have different thicknesses.

As illustrated in FIGS. 9 to 12, the plurality of permanent magnets 230 are provided in the same shape and are spaced the same each other in intervals a from circumferential direction. Here, circumferential lengths of the plurality of permanent magnets 230 are divided into first circumferential lengths L1, and interval lengths are divided into first interval lengths G1.

Figure 9:
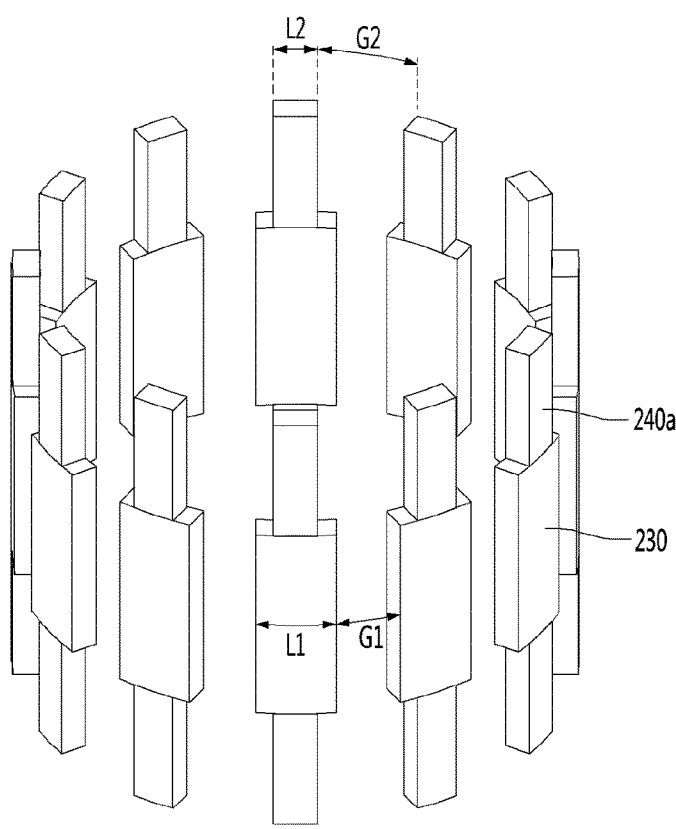
FIG. 9 is a view illustrating a permanent magnet and a sub core of a linear motor according to a first embodiment of the present invention.
Figure 10:
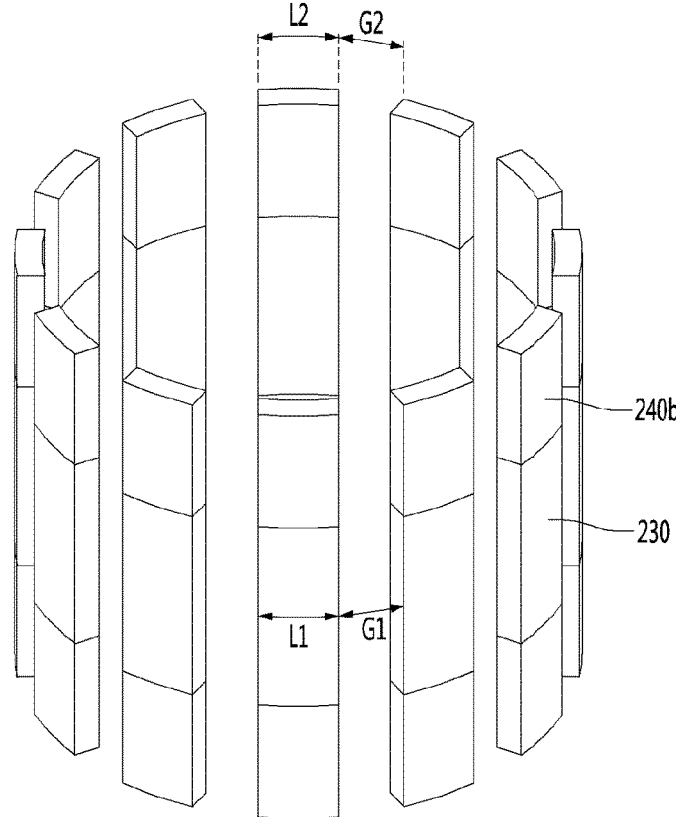
FIG. 10 is a view illustrating a permanent magnet and a sub core of a linear motor according to a second embodiment of the present invention.
Figure 11:
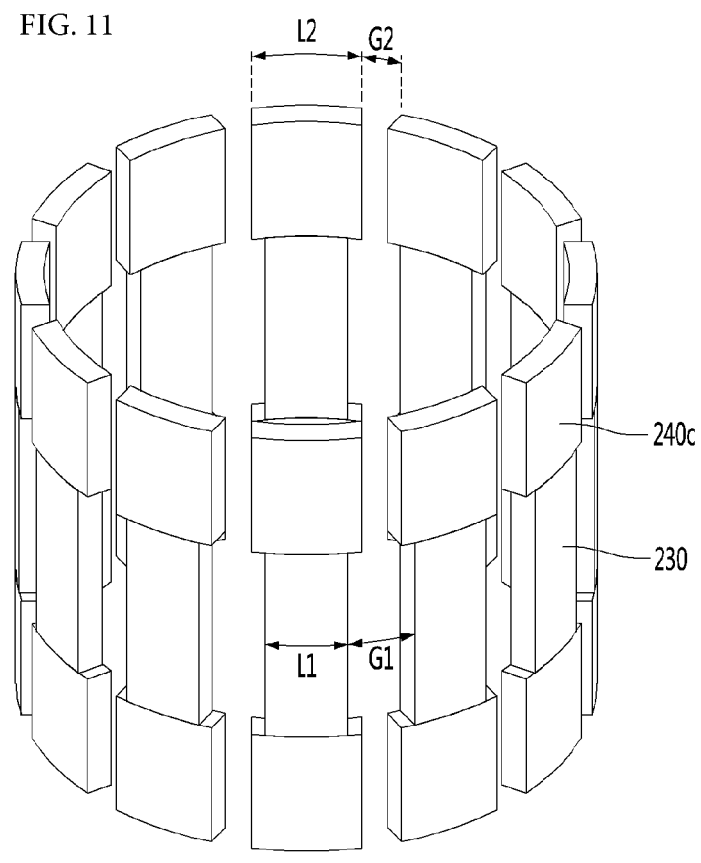
FIG. 11 is a view illustrating a permanent magnet and a sub core of a linear motor according to a third embodiment of the present invention.

As illustrated in FIGS. 9 to 11, the sub core 240 is provided in a number corresponding to the plurality of permanent magnets 230. For example, when 12 permanent magnets 230 are provided, 12 sub cores 240 are also provided.

In detail, as described above, the sub core 240 is provided on each of both sides of the permanent magnet 230 in an axial direction. Thus, it may be understood that 12 front sub cores 242 are provided, and 12 rear sub cores 244 are provided. Since the front sub core 242 and the rear sub core 244 are formed identically, only one of the cores will be described.

The plurality of sub cores 240 are provided in the same shape and are spaced the same interval from each other in the circumferential direction. Here, circumferential lengths of the plurality of sub cores 240 are divided into second circumferential lengths L2, and interval lengths are divided into second interval lengths G2. Here, the sub cores 240 may respectively extend to both sides in the circumferential direction with respect to a co-axis of the permanent magnets 230.

With reference to the permanent magnet 230 and the sub core (hereinafter, referred to as a first sub core 240a) illustrated in FIG. 9, the permanent magnet 230 and the sub core 240a are provided in the same number. Each of the plurality of permanent 230 has magnets a first circumferential length L1, and the plurality of permanent magnets 230 are spaced a first interval length G1 from each other. Also, each of the plurality of first sub cores 240a has a second circumferential length L2, and the plurality of first sub cores 240a are spaced a second interval length G2 from each other.

Here, the first circumferential length L1 is greater than the second circumferential length L2. Also, the first interval length G1 is less than the second interval length G2. In other words, the first sub core 240a has a circumferential length less than that of the permanent magnet 230 and is spaced a larger interval from the permanent magnet 230.

With reference to the permanent magnet 230 and the sub core (hereinafter, referred to as a second sub core 240b) illustrated in FIG. 10, the permanent magnet 230 and the sub core 240b are provided in the same number. Each of the plurality of permanent magnets 230 has a first circumferential length L1, and the plurality of permanent magnets 230 are spaced a first interval length G1 from each other. Also, each of the plurality of second sub cores 240b has a second circumferential length L2, and the plurality of first sub cores 240a are spaced a second interval length G2 from each other.

Here, the first circumferential length L1 and the second circumferential length L2 are the same. Also, the first interval length G1 and the second interval length G2 are the same. In other words, the second sub core 240b has the same circumferential length as the permanent magnet 230 and is spaced the same interval from the permanent magnet 230.

With reference to the permanent magnet 230 and the sub core (hereinafter, referred to as a third sub core 240c) illustrated in FIG. 11, the permanent magnet 230 and the sub core 240c are provided in the same number. Each of the plurality of permanent magnets 230 has a first circumferential length L1, and the plurality of permanent magnets 230 are spaced a first interval length G1 from each other. Also, each of the plurality of second sub cores 240b has a second circumferential length L2, and the plurality of first sub cores 240a are spaced a second interval length G2 from each other.

Here, the first circumferential length L1 is less than the second circumferential length L2. Also, the first interval length G1 is greater than the second interval length G2. In other words, the third sub core 240c has a circumferential length greater than that of the permanent magnet 230 and is spaced a shorter interval from the permanent magnet 230.

In summary, the sub cores 240 are provided in the same number as the permanent magnets 230 and may have various circumferential lengths. In detail, the sub core 240 may have a circumferential length less than, equal to, or greater than that of the permanent magnet 230.

Figure 12:
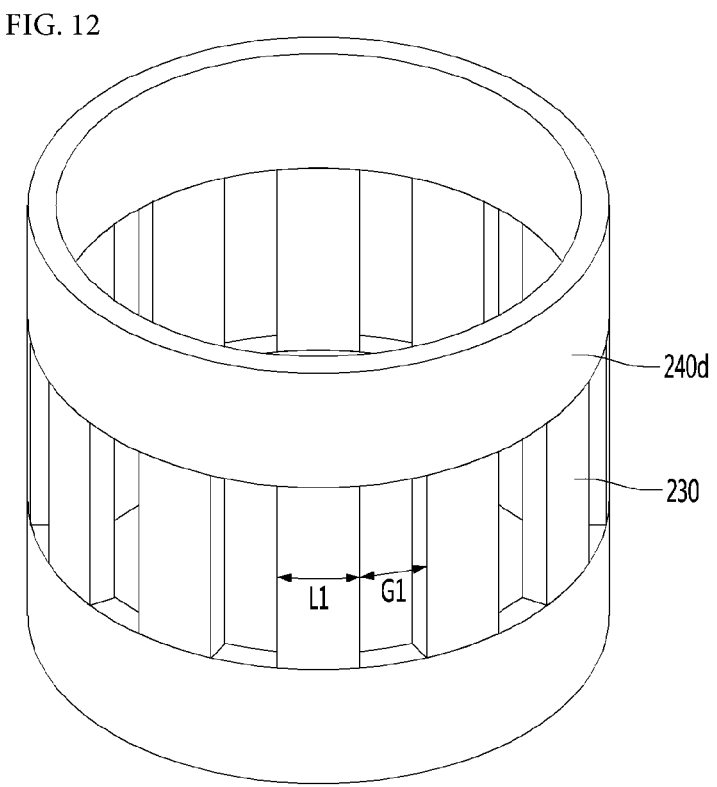
FIG. 12 is a view illustrating a permanent magnet and a sub core of a linear motor according to a fourth embodiment of the present invention.

Also, as illustrated in FIG. 12, the sub core (hereinafter, referred to as a fourth sub core 240d) may be provided in a single ring shape. Here, it is understood that the plurality of permanent magnets 230 are spaced apart from each other in a circumferential direction and are arranged in a circular shape having a diameter R, and the fourth sub core 240d is formed as a ring having the diameter R.

As described above, the length of the sub core 240 in the circumferential direction may be changed differently depending on the design. In detail, usage of the sub core 240 may increase in an order of FIGS. 9, 10, 11, and 12. As the usage of the sub core 240 increases, counter electromotive force may increase to further improve an output of the linear motor 200.

On the other hand, the usage of the sub core 240 may decrease in an order of FIGS. 12, 11, 10, and 9. When the usage of the sub core 240 decreases, a weight of the rotor 230 and 240 is reduced as a whole. Therefore, a high-speed operation of the linear motor 200 may be more effectively performed.

As described above, the usage of the permanent magnet 230 may decrease through the sub core 240, or the output of the linear motor 200 may be improved.

The invention claimed is:

1. A linear motor comprising:
a first stator;
a second stator disposed inside the first stator; and
an armature configured to move in an axial direction between the first stator and the second stator,
wherein the armature comprises:
   a plurality of permanent magnets,
   a front sub core disposed in front of each of the plurality of permanent magnets in the axial direction, and
   a rear sub core spaced apart from the front sub core in the axial direction, the rear sub core being disposed behind each of the plurality of permanent magnets in the axial direction,
wherein the front sub core and the rear sub core have a same shape,
wherein the armature has a first axial length (H1) that is a distance between ends of the front sub core and the rear sub core in the axial direction,
wherein the second stator has a second axial length (H2) in the axial direction,
wherein the second axial length (H2) is greater than an axial length of each of the plurality of permanent magnets and is less than the first axial length (H1),
wherein the permanent magnets reciprocate in the axial direction within a range of the second axial length (H2),
wherein the front sub core and the rear sub core are provided in numbers corresponding to the plurality of permanent magnets and respectively disposed at front and rear sides of the permanent magnets,
wherein each of the permanent magnets has a first circumferential length (L1) in a circumferential direction,
wherein each of the front sub cores and the rear sub cores has a second circumferential length (L2) in the circumferential direction,
wherein the first circumferential length (L1) is greater than the second circumferential length (L2),
wherein the permanent magnets disposed adjacent to each other are spaced apart from each other by a first interval length (G1) in the circumferential direction,
wherein the front sub cores disposed adjacent to each other or the rear sub cores disposed adjacent to each other are spaced apart from each other by a second interval length (G2) in the circumferential direction, and
wherein the first interval length (G1) is less than the second interval length (G2).

2. The linear motor according to claim 1,
wherein the first interval length (G1) is greater than the first circumferential length (L1).

3. The linear motor according to claim 2, wherein the first interval length (G1) is 1.1 to 1.7 times the first circumferential length (L1).

4. The linear motor according to claim 1, wherein the first stator has a third axial length (H3) in the axial direction, and
wherein the first axial length (H1) is less than the third axial length (H3).

5. The linear motor according to claim 1, wherein the front sub core and the rear sub core are disposed to be in close contact with front and rear ends of each of the permanent magnets in the axial direction, respectively.

6. The linear motor according to claim 1, wherein each of the front sub core and the rear sub core is provided as an electrical steel plate or made of a soft magnetic composite (SMC).

7. A linear compressor comprising:
a cylinder;
a piston disposed in the cylinder and configured to reciprocate in an axial direction;
a frame comprising (i) a frame body that accommodates the cylinder and (ii) a frame flange extending radially from a front portion of the frame body in the axial direction;
a first stator disposed behind the frame flange in the axial direction;
a second stator disposed inside the first stator, the second stator being fixed to an outside of the frame body; and
an armature disposed between the first stator and the second stator, the armature being connected to the piston,
wherein the armature comprises:
   a plurality of permanent magnets,
   a front sub core disposed at a front side of each of the permanent magnets in the axial direction, and
   a rear sub core disposed at a rear side of each of the permanent magnets in the axial direction,
wherein the armature has a first axial length (H1) that is a distance between ends of the front sub core and the rear sub core in the axial direction,
wherein the second stator has a second axial length (H2) in the axial direction,
wherein the second axial length (H2) is greater than an axial length of each of the plurality of permanent magnets and is less than the first axial length (H1),
wherein the permanent magnets reciprocate in the axial direction within a range of the second axial length (H2),
wherein the front sub core and the rear sub core are provided in numbers corresponding to the plurality of permanent magnets and are respectively disposed at front and rear sides of the permanent magnets,
wherein each of the permanent magnets has a first circumferential length (L1) in a circumferential direction,
wherein each of the front sub cores and the rear sub cores has a second circumferential length (L2) in the circumferential direction,
wherein the first circumferential length (L1) is greater than the second circumferential length (L2), wherein the permanent magnets disposed adjacent to each other are spaced apart from each other by a first interval length (G1) in the circumferential direction, wherein the front sub cores disposed adjacent to each other or the rear sub cores disposed adjacent to each other are spaced apart from each other by a second interval length (G2) in the circumferential direction, and wherein the first interval length (G1) is less than the second interval length (G2).

8. The linear compressor according to claim 7, further comprising a magnet frame having a cylindrical shape, the magnet frame connecting the armature to the piston, wherein the plurality of permanent magnets, the front sub core, and the rear sub core are attached to the magnet frame.

\* \* \* \* \*